United States Patent [19]
Vickers et al.

[11] Patent Number: 5,592,176
[45] Date of Patent: Jan. 7, 1997

[54] TRACKING SYSTEM FOR TRACKING A MOVING SIGNAL SOURCE

[75] Inventors: Edward H. Vickers, Auburn; Philip C. Lewis, Duluth, both of Ga.

[73] Assignee: Scientific-Atlanta, Inc., Norcross, Ga.

[21] Appl. No.: 411,423

[22] Filed: Mar. 30, 1995

[51] Int. Cl.$^6$ .................................................. H01Q 3/00
[52] U.S. Cl. ............................................ 342/359; 342/75
[58] Field of Search .............................. 342/359, 75, 76, 342/77

[56] References Cited

U.S. PATENT DOCUMENTS

| | | | |
|---|---|---|---|
| 4,063,250 | 12/1977 | Fenwick | 343/844 |
| 4,145,693 | 3/1979 | Fenwick | 343/722 |
| 4,148,029 | 4/1979 | Quesinberry . | |
| 4,290,071 | 9/1981 | Fenwick | 343/819 |
| 4,675,871 | 6/1987 | Gordon et al. | 371/46 |
| 4,794,341 | 12/1988 | Barton et al. | 329/50 |
| 4,837,576 | 6/1989 | Schwarz | 342/77 |

OTHER PUBLICATIONS

V. J. Slabinski, "Expressions for the Time Varying Topocentric Direction of a Geostationary Satellite", COMSAT Technical Review vol. 5, No. 1, Spring 1975, pp. 1–14.

J. Jankowski, "Operational Planning for the Deployment of Satellites with Inclined Orbit", INTELSAT Inclined Orbit Seminar, 24–25 Oct. 1991, 10–1–1, pp. 1–6.

G. D. Gordon, "Motion of Satellites and Need for Tracking", INTELSAT Inclined Orbit Seminar, 24–25 Oct. 1991, 10–1–2, pp. 1–13.

P. Roach, "Operational Impact of Inclined Orbit Satellites", INTELSAT Inclined Orbit Seminar, 24–25 Oct. 1991, 10–1–3, pp. 1–10.

M. Mohajeri, "Terms, Conditions and Tariff Incentives for Services on Designated IOO Satellites", INTELSAT Inclined Orbit Seminar, 24–25 Oct. 1991, 10–1–4, pp. 1–3.

M. Mohajeri, "Cancellation Policy for Preemptible Leases on Designated IOO Capacity", INTELSAT Inclined Orbit Seminar, 24–25 Oct. 1991, Attachment No. 1 to IO–1–4, pp. 1–3.

F. Loureiro, "INTELSAT Assistance and Development Program", INTELSAT Inclined Orbit Seminar, 24–25 Oct. 1991, 10–1–5, pp. 1–8.

E. Denoyer, "Low Cost Inclined Orbit Operation System: The Domestic POLYSAT Network", Presentation of Alcatel Telspace, INTELSAT Inclined Orbit Seminar, 24–25 Oct. 1991, pp. 1–8.

"TRAX II Tracking Unit", Presentation of AstroGuide, INTELSAT Inclined Orbit Seminar, 24–25 Oct. 1991, 10 viewgraphs.

"Tracking Equipment for Inclined Orbit Operations", Presentation of COMSAT General, INTELSAT Inclined Orbit Seminar, 24–25 Oct. 1991, 10 viewgraphs.

T. L. Bratton et al., "A Tracking Approach for Inclined Orbit Satellites", Presentation by Electrospace Systems, Inc., INTELSAT Inclined Orbit Seminar, 24–25 Oct. 1991, pp. 1–9.

Jones, "Inclined Satellite Orbit Operation", Presentation by Ferranti International, INTELSAT Inclined Orbit Seminar, 24–25 Oct. 1991., 4 pgs.

S. Skjei, "Engineering and Operational Experience with GSTAR III", Presentation by GTE Spacenet, INTELSAT Inclined Orbit Seminar, 24–25 Oct. 1991, viewgraph pp. 1–9.

(List continued on next page.)

*Primary Examiner*—Theodore M. Blum
*Attorney, Agent, or Firm*—Banner & Allegretti, Ltd.

[57] ABSTRACT

An antenna tracking controller for generating signals used to position an antenna for tracking a moving signal source includes a first Kalman filter for estimating parameters of a first model of the motion of the moving signal source a second Kalman filter for estimating parameters of a second model of the motion of the moving signal source. The second Kalman filter uses the parameters estimated by the first Kalman filter as initial values. A model quality charge/discharge is also provided to monitor the status of the data base.

4 Claims, 8 Drawing Sheets

OTHER PUBLICATIONS

B. Olson et al., "Presentation for the Intelsat Seminar", Presentation by Merrimac Satellite, INTELSAT Inclined Orbit Seminar, 24–25 Oct. 1991, 3 pgs.

T. M. Mynett, "Tracking Inclined Orbit Satellites", Presentation by Scientific-Atlanta, Inc., INTELSAT Inclined Orbit Seminar, 24–25 Oct. 1991, pp. 1–8.

P. G. Blaney, "Model SAT90 Tracking Antenna Controller Technical Presentation", Presentation by SeaTel, INTELSAT Inclined Orbit Seminar, 24–25 Oct. 1991, pp. 1–12.

Smith et al., "Inclined-Orbit Operation of Existing 90–Mbps SATCOM Links on Telesat's Anik–C Satellites", Presentation by Telsat Canada, INTELSAT Inclined Orbit Seminar, 24–25 Oct. 1991, 18 viewgraphs.

Morales–Moreno, "Telsat's New 90–Mbps Modem for Inclined–Orbit Operation on the Anik–C (Ku–Band) Satellites", Presentation by Telsat, INTELSAT Inclined Orbit Seminar, 24–25 Oct. 1991, 16 viewgraphs.

D. J. Lee, "Teletronics' Tracker for Inclined Orbit Satellites", Presentation by Teletronics International, INTELSAT Inclined Orbit Seminar, 24–25 Oct. 1991, pp. 1–12.

J. Duller, "Antenna Control System", Presentation by TIW Systems, Inc., INTELSAT Inclined Orbit Seminar, 24–25 Oct. 1991, pp. 1–17.

R. Wieting, "Vertex Solutions to Inclined Orbit Tracking—Adaptive Step Track (AST) and Orbit Prediction Track (OPT)," Presentation by Vertex Communications Corp., INTELSAT Inclined Orbit Seminar, 24–25 Oct. 1991, 14 viewgraphs.

"Development of the Beam Squint Tracking System", Presentation by Weston Antennas Limited, INTELSAT Inclined Orbit Seminar, 24–25 Oct. 1991, pp. 1–6.

TRACKING SYSTEM FOR TRACKING A MOVING SIGNAL SOURCE

BACKGROUND OF THE INVENTION

1. Technical Field

The present invention generally relates to a tracking system for tracking a moving signal source and, more particularly, to a tracking system for tracking an inclined satellite.

2. Description of Related Art

Communications satellites most often orbit the earth in a geostationary orbit. This geostationary orbit is a circular orbit lying in the equatorial plane of the earth at 35,785.6 kilometers (22,247 miles) above the earth's surface at its equator. A satellite placed in such an orbit will have the same angular velocity as the angular velocity of the surface of the earth below. Thus, each satellite appears in one fixed orbital slot (or "station") in the sky. A fixed antenna may be permanently aimed at a targeted geostationary satellite.

Various forces act to perturb the orbit of a satellite in a geostationary orbit. The gravitational attraction of the moon and the sun perturb the orbit in a north-south direction and the radiation force of sunlight and asymmetries in the earth's gravitational field perturb the orbit in an east-west direction. By using thrusters, the satellite can be pushed back to its assigned station to counteract these perturbing forces. This process is known as stationkeeping. Predetermined limits are generally set which define how close a satellite must be kept to its assigned station. FIG. 1 depicts a "stationkeeping box" for a geostationary satellite at 30.0° W longitude. In accordance with the stationkeeping box of FIG. 1, the satellite longitude may vary from 29.9° to 30.1° W longitude and the satellite latitude may vary from 0.1° S to 0.1° N latitude. Since, at present, there is no way to refuel a satellite, the amount of propellant for the thrusters determines how long a satellite can be maintained within its stationkeeping box. Moreover, it takes five to ten times more propellant to correct for north-south variations than for east-west variation. Consequently, inclined orbit operations in which north-south stationkeeping is stopped have allowed satellite operators to extend the useful life of geostationary communications satellites. FIG. 2 is a diagram illustrating how a satellite's orbit becomes inclined and what effects it has on the observed satellite motion. It can be seen that for the entire day, the sun and moon pull on a geostationary satellite in a direction tending to align the satellite with their orbits. With no north-south stationkeeping, the satellite's orbit is continuously pulled away from its geostationary orbit and becomes "inclined" with respect to the equatorial plane of the earth. A satellite in an inclined orbit appears to be above its equatorial position for one half the earth's rotation and below its equatorial position for the other half.

If the orbit becomes inclined with respect to the celestial equator, the satellite appears to move in a pattern that repeats with each rotation of the earth (i.e., once every sidereal day or 23 hours, 56 minutes, and 4.1 seconds). For low inclinations (approximately 1.5° or less), the apparent satellite motion resembles an ellipse. As the satellite inclination increases, the satellite's apparent motion becomes a figure-8. FIG. 3 shows the topocentric motion of the satellite GSTAR III in celestial latitude and longitude. GSTAR III has an inclination of approximately 6.2°. The figure-8 of FIG. 3 is the pattern an observer would see if the observer was on the equator at 267° E longitude. The equations that yield the approximation of this motion may be found, for example, in Pritchard et at., "Satellite Communication Systems Engineering", 2nd ed., Prentice-Hall, N.J. (1993). An observer viewing the satellite from the earth's equator and on the same longitude meridian as the nominal longitude of the satellite sees a smooth and symmetric ellipse or figure-8. An observer that views the satellite from a position not at the equator sees distorted apparent motion. A simple figure-8 equation cannot model the apparent motion because of distortion in the apparent motion of the satellite; normal drift of the satellite; regular station-keeping motion of the satellite; and because the figure-8 pattern only appears for higher inclinations. FIG. 4 shows the apparent motion of GSTAR III as viewed from 275.85° E longitude and 33.94° N latitude. The pattern is recognizable as a figure-8, but simple equations no longer describe the motion.

When inclined orbit satellites are used, an earth station antenna must be able to track the daily movements of the satellites. To implement such tracking, various tracking techniques have been implemented. Low-cost satellite tracking systems frequently use a step-track algorithm to track an inclined satellite. A step-track algorithm automatically finds the antenna position at which the strength of a received beacon signal is maximum. In general, the step-track algorithm causes the antenna to execute excursions about some nominal position. The signal strength is sampled during the excursions and the antenna is moved in the direction of the increasing signal strength. This scanning process is repeated until a stop criterion, indicating that the antenna has found the peak signal, is met. The scanning process is re-initiated based on (1) regular intervals determined by a time threshold value; (2) detections of the signal strength dropping below a specified level; or (3) a combination of both.

A step-track algorithm cannot, however, function if the tracking system loses the beacon signal. Thus, a method of using collected data to predict positions of the satellite is required to follow the satellite when tracking information such as a beacon signal is not available. One method used is to store satellite positions in a so-called park table each time the system peaks the antenna on the satellite signal. The tracking system creates and saves the park table over a period of one sidereal day. This method, called memory or program track, uses the park table to predict satellite locations over each succeeding sidereal day. An interpolation method is used to predict positions between sample times. Program track suffers from several disadvantages. First, the data becomes inaccurate as its age increases. Second, since the tracking of a high inclined satellite generally requires that a large number (e.g., 96) of satellite positions in terms of azimuth and elevation be stored in the park table over a sidereal day, a relatively large memory is required. Third, after a stationkeeping move, the park table data becomes invalid.

A second method used to follow the satellite during times when no tracking information is available is known as parameter tracking and requires a mathematical model of the satellite motion based on parameters obtained from a remote site. The INTELSAT eleven parameter model is an example of this method. This method works well, but it requires a model and the model parameters must be updated regularly for normal satellite motion and stationkeeping moves. A detailed description of the INTELSAT eleven parameter model may be found, for example, in Chang et al., "Inclined Orbit Satellite Operation in the INTELSAT System," INTELSAT, Washington, D.C. (1991).

A third method used to follow the satellite during times when no tracking information is available requires an algorithm which computes parameters for an orbital model from satellite position data. This method can be implemented using park table data. However, if the algorithm uses a park table, it still has the disadvantage of requiring a relatively large memory. In fact, additional memory is required to store the model parameters.

Accordingly, there is a need for a method of accurately tracking an inclined satellite during times when no tracking information is available and which does not require a large memory.

SUMMARY OF THE INVENTION

In accordance with the present invention, the disadvantage of large memory is overcome by estimating orbital parameters from the satellite position data immediately when the antenna tracking control system collects the data. After the estimation step, the data is discarded.

In accordance with the present invention, an antenna tracking controller for generating signals used to position an antenna for tracking a moving signal source includes a first Kalman filter for estimating parameters of a first model of the motion of the moving signal source and a second Kalman filter for estimating parameters of a second model of the motion of the moving signal source. The second Kalman filter uses the parameters estimated by the first Kalman filter as initial values. A model quality charge/discharge is also provided to monitor the status of the data base.

The tracking system of the present invention utilizes Kalman filters to estimate a set of parameters that may be used to determine the position of the satellite at any given time. The orbital model is updated after every peaking cycle, resulting in full utilization of all measured position data. The inventive tracking system also allows the beam radial error between predicted and measured data to be computed and scaled in terms of percent of antenna beamwidth. The tracking system further provides database aging, which automatically degrades the state of the model if it is not periodically refreshed. The degree of aging is maintained in memory and may be displayed as a database "charge", analogous to charging/discharging a battery, and varies from 0%, for no data, to 100% for a fully charged database.

The features and advantages of the present invention will be better understood from a reading of the following detailed description in conjunction with the accompanying drawings.

DETAILED DESCRIPTION

Figure 1:
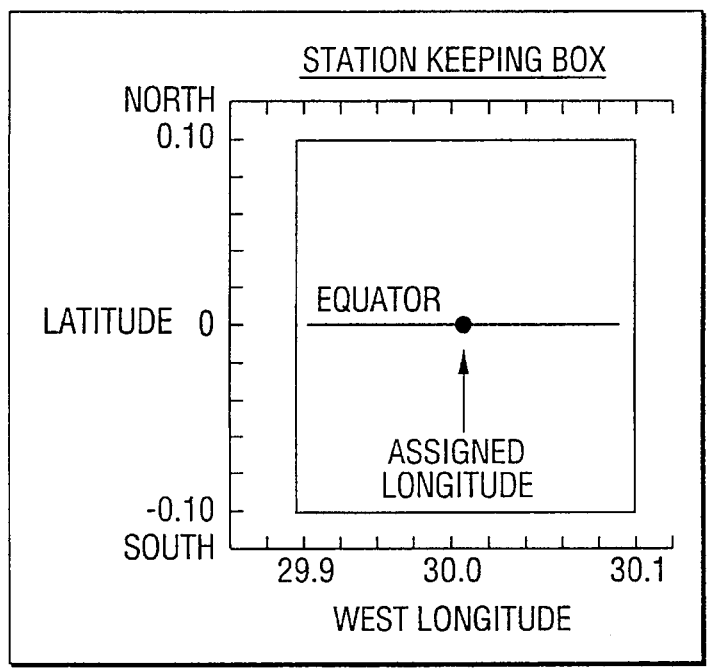
FIG. 1 is a diagram of a stationkeeping box for a geostationary satellite.
Figure 2:
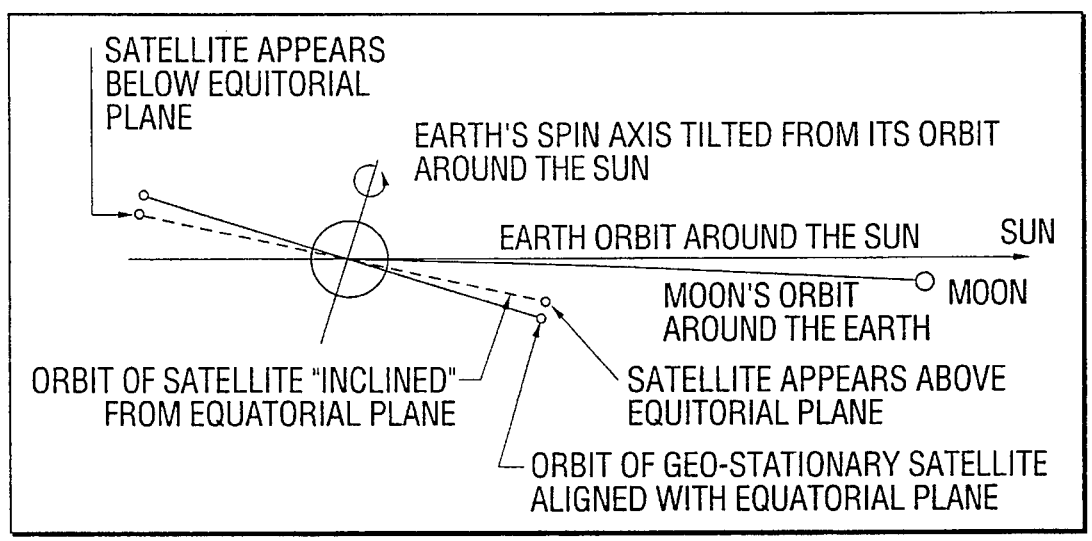
FIG. 2 is a diagram illustrating an inclined satellite orbit.
Figure 3:
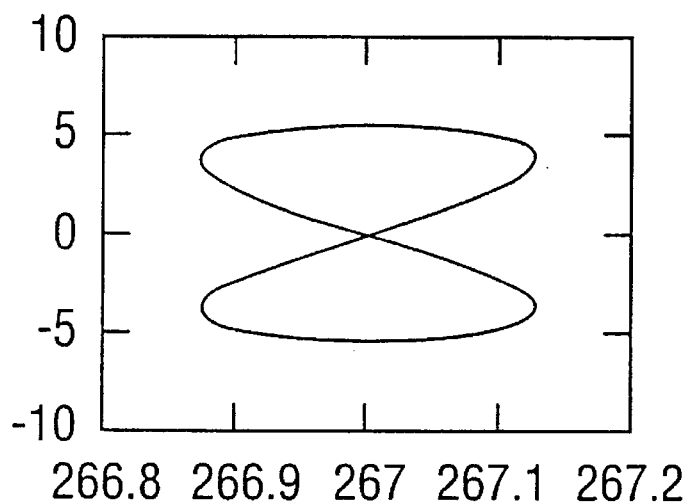
FIG. 3 shows the apparent motion of the satellite GSTAR III in celestial latitude and longitude as viewed on the equator at 267° E longitude.
Figure 4:
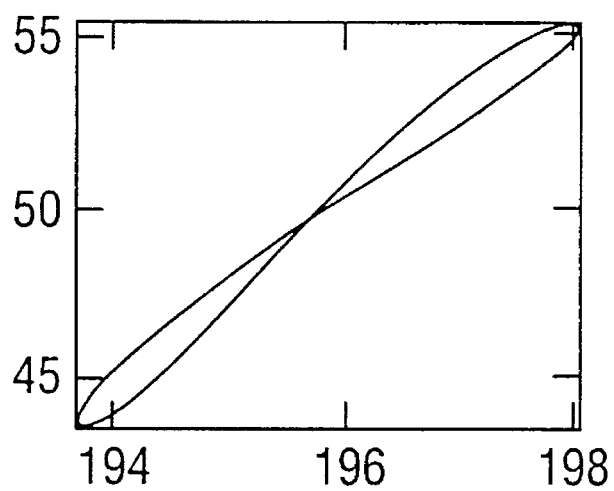
FIG. 4 shows the apparent motion of the satellite GSTAR III in celestial latitude and longitude as viewed at 275.85° E longitude and 33.94° N latitude.
Figure 5:
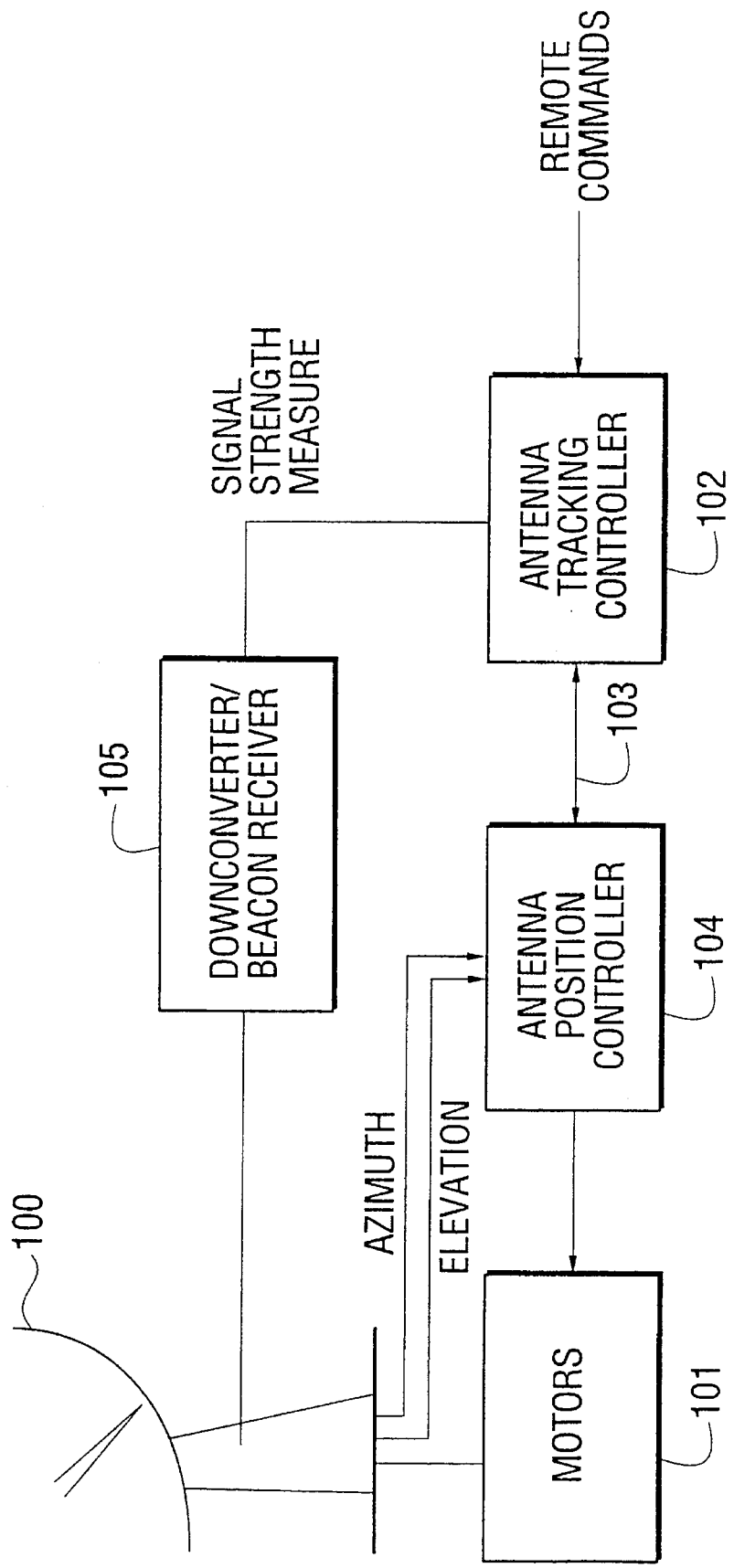
FIG. 5 is a block diagram of a tracking system in accordance with the present invention.

FIG. 5 illustrates a tracking system in accordance with the present invention which includes an antenna 100. Although the discussion below is specifically directed to a satellite tracking system for tracking inclined satellites, the invention is not limited in this respect and may be applied to tracking other types of satellites and moving signal sources. Antenna 100 may be any suitable, for example, one antenna manufactured by Scientific-Atlanta, Inc. of Norcross, Ga. and is selectively driven in both elevation and azimuth by motors 101. An antenna tracking controller 102 is linked via a bidirectional serial link 103 to an antenna position controller 104. Antenna position controller 104 may, for example, be a Model 8861, 8862, or 8864 Antenna Position Controller available from Scientific-Atlanta Inc. of Norcross, Ga., although the invention is not limited in this respect. The Model 8861 is a single speed positioner and the Models 8862 and 8864 are variable speed positioners. Tracking generally works best with the variable speed positioners, although the invention is not limited in this respect. Antenna position controller 104 processes position feedback (azimuth and elevation) from antenna 100 and is responsive to commands from antenna tracking controller 102 for driving motors 101 to thereby position antenna 100.

Antenna 100 receives a down link signal which may, for example, be in the Ku frequency band of 12–14 GHz. The received signal is supplied to a downconverter/beacon receiver 105 which generates a DC voltage level which is proportional to the received signal strength and is indicative of the antenna's pointing error. The DC voltage level is supplied to antenna tracking controller 102. Downconverter/beacon receiver 105 may, for example, be a Scientific-Atlanta Model 7753 or 7754 Series. Alternatively, one or more video receivers (such as a Scientific-Atlanta Model 7530) may be used to provide signal strength measurements for satellites that do not have beacons. The signal strength measurement in this instance is a video AGC signal which is a nonlinear measurement of the signal strength coming into the receiver. Tracking based on a video AGC signal generally degrades the performance of peaking algorithms. However, as will be discussed below, the tracking system of the present invention is based on the use of Kalman filters which smooth out errors and provide better estimates of orbital model parameters. If a signal is lost and tracking is carded out using the model after the signal loss, the tracking will generally be less accurate for a video AGC database. The above-described signal strength measurements are the basis of the antenna positioning operation. Antenna tracking controller 102 may also receive commands via a serial link from, for example, a Model 7670 Earth Station Controller (available from Scientific-Atlanta, Inc.) located at a remote control site.

In general, positioning commands are supplied from antenna tracking controller 102 to antenna position controller 104 via serial link 103. Antenna tracking controller 102 periodically polls antenna position controller 104 to obtain position data (i.e., azimuth and elevation). That is, the antenna position data of antenna position controller 104 is supplied to antenna tracking controller 102 in response to polling commands. Thus, antenna tracking controller 102 generates position commands for positioning antenna 100 which are supplied to antenna position controller 104 and antenna position controller 104 reports back the actual antenna position. Antenna position controller 104 uses the position commands to generate motor control signals for driving motors 101 to appropriately move antenna 100.

Figure 6:
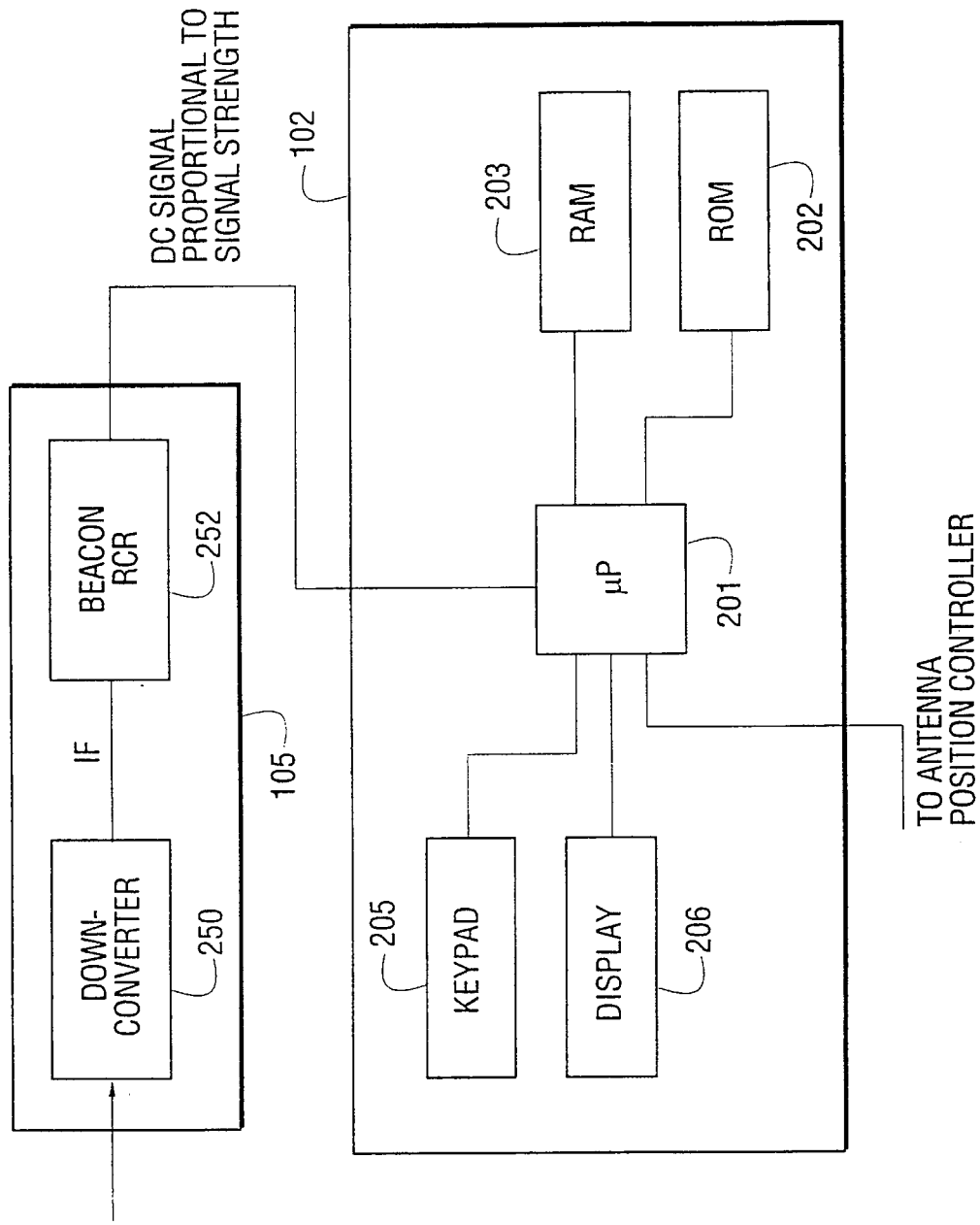
FIG. 6 is a block diagram of antenna tracking controller 102 and downcoverter/beacon receiver 105 of FIG. 5.

FIG. 6 shows block diagrams of antenna tracking controller 102 and downconverter/beacon receiver 105. Downconverter/beacon receiver 105 includes a downconverter 250 which downconverts a signal from antenna 100 to an intermediate frequency (IF) which is supplied to a beacon receiver 252. Beacon receiver 252 outputs a DC signal which is proportional to the strength of the signal from antenna 100 and supplies this DC signal to antenna tracking controller 102 as a tracking reference signal. Antenna tracking controller 102 includes a microprocessor 201 which controls the overall tracking operation. Microprocessor 201 may, for example, be a Model 68000 available from Motorola. An EPROM 202 stores the tracking system operating programs. A battery backed-up non-volatile RAM (NVRAM) 203 stores data generated during tracking system operation. A keypad 205 allows a user to enter antenna control information. The entered information, current settings for antenna control parameters, and alarm and status indications may be viewed via a display 206 such as a liquid crystal display.

In accordance with the present invention, a Kalman filter algorithm stored in EPROM 202 is used to estimate a set of parameters that may be used to determine the position of a satellite at any given time. The estimated parameters are stored in memory such as NVRAM 203. The theory and operation of Kalman filters has been widely discussed in the technical literature, for example, in Kalman, R. E., "A New Approach to Linear Filtering and Prediction Problems," *Transactions of the ASME, Journal of Basic Engineering*, Series 82D, pp. 35–45, March 1960; Kalman et al., *"New Results in Linear Filtering and Prediction Theory,"* Transactions of the ASME, Journal of Basic Engineering, Series 83D, pp. 95–108, March 1961; Mendel, J. M., *"Bibliography on the Linear-Quadratic-Gaussian Problem,"* IEEE Transactions on Automatic Control, vol. AC-16, no. 6, December 1971; Sorenson, H. W., ed., Kahnan Filtering: Theory and Applications, IEEE Press, New York, 1985; and Sorenson, H. W., "Kalman Filtering Techniques," from Advances in Control Systems Theory and Applications, vol. 3, C. T. Leondes, ed., pp. 219–292, Academic Press, Inc., 1966.

In a currently contemplated implementation, the Kalman filter estimates ten parameters of an orbital model for inclined satellites developed by Slabinski and described in Slabinski, *Expressions for the Time-Varying Topocentric Direction of a Geostationary Satellite*, COMSAT Technical Review, Volume 5, Number 1, Spring 1975. The ten parameters include five parameters for determining azimuth and five parameters for determining elevation. The Slabinski model is in the antenna-based coordinate system (azimuth and elevation). As will be explained below, this contributes to the ability of antenna tracking controller 102 to store a database for a satellite in less memory and allows storage of databases for up to five different satellites in an NVRAM 203 of 256 kilobytes or less.

Kalman filtering is a recursive filtering technique using a linear time-varying discrete-time inverse filter function that provides a least-mean-square error estimate of a discrete time signal based on noisy observations and that makes use of an adaptive algorithm, such as a computer program or segment, suitable for direct evaluation by a digital computer.

In the simplest case, the Kalman filter equations reduce to the deterministic recursive least squares problem. The Kalman algorithm is different from this problem in that the Kalman algorithm uses noise covariances which are defined as values instead of being assumed to be experimental error. The Kalman filter requires that the orbital model be in the following general form:

$$x_{k+1} = \Phi_k x_k + w_k \qquad (1)$$

$$z_k = H_k x_k + v_k \qquad (2)$$

where k is a sample time, $x_{k+1}$ is an estimation at sample time k+1; $x_k$ is an estimation at sample time k; $\Phi_k$ is the relationship between measurements at different sample times; $w_k$ is noise having a known covariance; $z_k$ is a measurement at sample time k; $H_k$ is the ideal or noiseless relationship between $x_k$ and $z_k$; and $v_k$ is the measurement error at sample time k. The Kalman filter equations are a set of recursive equations in which the output of the last equation is fed back to the Kalman filter as new data. In accordance with the present invention, an orbital model for tracking an inclined satellite is built by supplying satellite position data (azimuth and elevation) and error data to the Kalman filter at some initial time. It is initially assumed that the azimuth and elevation are zero and that the error of the algorithm is zero, i.e., it is assumed that the algorithm is perfect. The Kalman filter is based on the Slabinski orbital model for inclined satellites as noted above and uses the data supplied thereto to generate predicted azimuth and elevation values for the inclined satellite at a next sample time. Using a step-track algorithm, for example, the tracking system then makes a satellite position measurement at the next sample time by peaking on the signal strength of the incoming satellite signal. The predicted azimuth and elevation are compared to the measured azimuth and elevation to calculate a beam radial error. The most recent predictions and the calculated error are then fed back as inputs to the Kalman filter. New azimuth and elevation predictions are then generated and the process is repeated.

In a current implementation, the tracking system of the present invention uses at least two Kalman filters. More particularly, a first Kalman filter is a short-term Kalman filter for estimating the parameters associated with a short term orbital model using azimuth and elevation data measured during an initial time period of, for example, four hours. A second Kalman filter is a long-term Kalman filter for estimating the parameters associated with a long term orbital model using azimuth and elevation data measured during a time period subsequent to the initial four hour time period. The long-term Kalman filter is initially loaded with the last estimated parameters of the short-term Kalman filter. This loading of the long-term Kalman filter with the parameters estimated by the short-term Kalman filter allows the long-term Kalman filter to converge on accurate predictions more quickly.

For a given satellite, the following values are stored in NVRAM 203: (1) time of the prediction (in seconds from a fixed reference); (2) beam radial error of the prediction (average of the last sixteen beam radial errors); (3) the signal strength measurement at the last peaked position; and (4) the estimated orbital model parameters. Item (1) is a long integer and items (2)–(4) are floating point numbers. Thus, if ten orbital parameters are estimated, it can be seen that a total of 13 values are stored for a given satellite. This is in contrast to tracking systems utilizing a park table as described above. Such park tables typically contain data records for 24 to 96 or more satellite positions. Each record in the park table would include the time of the position measurement and the azimuth and elevation positions. Accordingly, it can be seen that up to 96 or more long integers and up to 192 or more floating point numbers would be stored in the park table. If an algorithm is used to compute orbital model parameters from the park table data, it can seen that even more memory will be required to store this parameter data. Thus, the tracking system of the instant invention significantly reduces the amount of memory required for tracking an inclined satellite and permits data for up to five different satellites to be stored in an NVRAM of 256 kilobytes or less.

Figure 7:
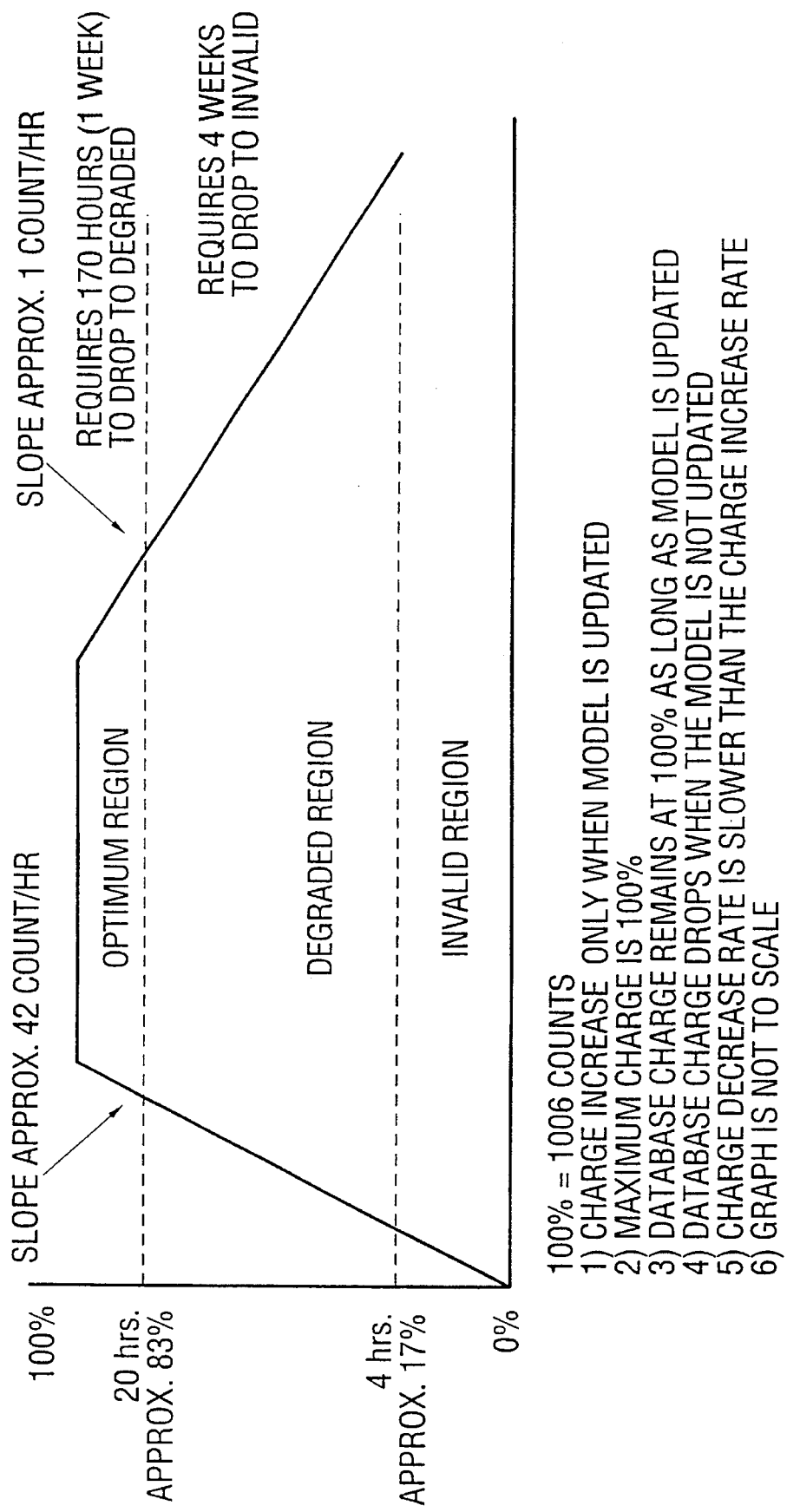
FIG. 7 is a diagram illustrating the various regions of model quality.

The tracking system of the present invention also provides a model quality charge/discharge to monitor the status of the data base. The charge has a maximum value of 100% and a minimum value of 0%. Microprocessor 201 of antenna tracking controller 102 implements this feature by incrementing and decrementing a counter. In accordance with a current implementation, this counter has a maximum count of 1008. When a model is being built, the charge is built up at a rate of approximately 42 counts per hour. With reference to FIG. 7, if a satellite has been tracked for less than 4 hours, the model is in an INVALID region which means that meaningful predictions of satellite position cannot be made using the model. After about 4 hours (i.e., when the model is approximately 17% charged), the model enters a DEGRADED region. In the DEGRADED region, predictions of satellite position can be made if, for example, the beacon is lost. After about 20 hours (i.e., when the model is approximately 83% charged), the OPTIMUM region is entered and predictions of satellite position can be made to within 5% of 3 dB beamwidth of the dish antenna beam. After about 24–28 hours, the model is fully charged to 100%. If the model continues to be updated, the charge remains at 100%. If the tracking system is commanded to track a new satellite, the database associated with the old satellite is saved (i.e., time of last prediction, beam radial error of the prediction, signal strength measurement at last peaked position, and the ten estimated parameters) and a new database is developed for the new satellite. During the time the new satellite is being tracked, the charge of the old database is decremented at a rate of approximately 1 count per hour. As the new satellite is tracked for a longer and longer period of time, the charge associated with the orbital model of the old satellite continues to be decremented until after approximately 168–170 hours, the model enters the DEGRADED region. If the new satellite is tracked for four more weeks, the charge associated with the orbital model of the old satellite enters the INVALID region.

Thus, the charge provides a quality measurement of how good a database of a particular satellite is. If the database of a particular satellite is being used and updated (i.e., a beacon signal comes in, azimuth and elevation predictions and measurements are made, and the model is updated), the charge is incremented. If the database of a particular satellite is not being used (e.g., a different satellite is being tracked) or if the beacon is lost and tracking of the particular satellite is carried out using the model, the charge is decremented. When the charge drops into the INVALID region, the corresponding database can no longer be used to make predictions. If, after the charge has been decremented, the model is built up again, charge is increased. Thus, database charge can cycle through charge and discharge cycles indefinitely. The charge increase rate is based upon empirical observations of how well the tracking system of the present invention works and the charge decrease rate is based upon empirical observations of how long accurate tracking continues after a beacon is lost. Of course, the rates of charge incrementing and charge decrementing set forth above are for illustrative purposes only and the invention is not limited in this respect.

The tracking system of the present invention will now be described in greater detail. In the paper Slabinski, "*Expressions for the Time-Varying Topocentric Direction of a Geostationary Satellite*", COMSAT Technical Review, Volume 5, Number 1, Spring 1975, a numerical model is shown which describes inclined geosynchronous satellite motion. The numerical model is first developed in a reference frame based on celestial latitude and longitude. Since antenna tracking systems commonly use a local reference frame based on azimuth and elevation, a coordinate transformation is necessary to convert between the two reference frames. However, the Slabinski paper notes that model parameters can be estimated in the local reference frame without the coordinate transformation. The coordinate transformation is inherent to the Slabinski model and is not explicitly calculated. The satellite model is expressed using the equations:

$$\text{Azimuth}(t)=a_0+a_1t+a_2t^2+a_3\cos(\omega t)+a_4\cos(2\omega t)+a_5\sin(\omega t)+a_6\sin(2\omega t)+a_7t\cos(\omega t)+a_8t\sin(\omega t) \quad (3)$$

$$\text{Elevation}(t)=e_0+e_1t+e_2t^2+e_3\cos(\omega t)+e_4\cos(2\omega t)+e_5\sin(\omega t)+e_6\sin(2\omega t)+e_7t\cos(\omega t)+e_8t\sin(\omega t) \quad (4)$$

The constant $\omega$ in equations (3) and (4) is the frequency of the earth's rotation which is equal to $72.92115\times10^{-6}$ rad/second. The $a_0$ and $e_0$ terms represent fixed terms; the terms which are linear in time represent drift terms; the terms which are quadratic in time represent acceleration terms; the trigonometric terms are motion terms representing satellite position changes with respect to time; and the Poisson terms represent the rate of change of satellite position with respect to time. The trigonometric terms which are double frequency terms (i.e., the $2\omega t$ terms) yield additional harmonics of motion. For satellites above 5° of inclination, these second harmonic terms become significant. Above 10°, additional harmonic terms (not shown) become important and should be included in the model.

The tracking system of the present invention uses only selected terms from the Slabinski model. There are several reasons for this. The first is the complexity of the calculations involved. If many terms are included, it is resource intensive to run calculations during a sampling period and to make a prediction. Since a current implementation of antenna tracking controller 102 utilizes a Motorola 68000 microprocessor, it is difficult to utilize the full Slabinsld orbital model. In accordance with a current implementation of the instant invention, the orbital model is limited to satellites having an inclination of 7° or less in order to simplify the mathematics involved by reducing the number of trigonometric terms involved. However, it will be appreciated that the present invention is not limited in this respect and it will be apparent that the number and type of terms included in the model may be varied in accordance with the processing power which is available. In addition, since the tracking system of the present invention is designed to adapt to changing parameters, in a current implementation, the long-term parameters (with estimation periods up to twenty-eight days) are removed. Accordingly, the model used by the tracking system of this invention is:

$$\text{Azimuth}(t)=a_0+a_3\cos(\omega t)+a_4\cos(2\omega t)+a_5\sin(\omega t)+a_6\sin(2\omega t) \quad (5)$$

$$\text{Elevation}(t)=e_0+e_3\cos(\omega t)+e_4\cos(2\omega t)+e_5\sin(\omega t)+e_6\sin(2\omega t) \quad (6)$$

The methodology of the present invention uses Kalman filters to estimate the ten parameters $a_0$, $a_3$, $a_4$, $a_5$, $a_6$, $e_0$, $e_3$, $e_4$, $e_5$, $e_6$. From the estimation of these parameters, predictions of azimuth an elevation can be made using equations (5) and (6). As noted above, to use the Kalman filter, the orbital model must be in the general form given by equations (1) and (2), i.e.:

$$x_{k+1} = \Phi_k x_k + w_k \quad (1)$$

$$z_k = H_k x_k + v_k \quad (2)$$

where
k is a sample time; $x_{k+1}$ is an (n×1) process state vector (i.e., the value to be estimated) at time $t_{k+1}$; $x_k$ is an (n×1) process state vector (i.e., the value to be estimated) at time $t_k$; $\Phi_k$ is an (n×n) state transition matrix which describes the relationship between values measured at different time samples; $w_k$ is an (n×1) uncorrelated (white) noise sequence vector with known covariance; $z_k$ is an (m×1) measurement vector at time $t_k$; $H_k$ is an (m×m) matrix giving the ideal or noiseless relationship between $x_k$ and $z_k$; and $v_k$ is an (m×1) measurement error vector.

The vectors $w_k$ and $v_k$ model system noise and measurement errors, and thus must be uncorrelated with each other. The model shown in equations (5) and (6) can be written in the form of equations (1) and (2) as follows:

$$x_k = \begin{bmatrix} a_0 \\ a_3 \\ a_4 \\ a_5 \\ a_6 \end{bmatrix} + w_k \quad (7)$$

$$z_k = [1 \; \cos(\omega t_k) \; \cos(2\omega t_k) \; \sin(\omega t_k) \; \sin(2\omega t_k)] \begin{bmatrix} a_0 \\ a_3 \\ a_4 \\ a_5 \\ a_6 \end{bmatrix} + v_k \quad (8)$$

$$\text{Azimuth}(t_k) = z_k \quad (9)$$

Equations (7), (8), and (9) define a long-term model for azimuth. A short-term model for azimuth is similar except that the $a_4$, $a_6$, $\cos(2\omega t_k)$, and $\sin(2\omega t_k)$ elements are not used. Thus, the short-term model for azimuth is:

$$x_k = \begin{bmatrix} a_0 \\ a_3 \\ a_5 \end{bmatrix} + w_k \quad (10)$$

$$z_k = [1 \; \cos(\omega t_k) \; \sin(\omega t_k)] \begin{bmatrix} a_0 \\ a_3 \\ a_5 \end{bmatrix} \quad (11)$$

$$\text{Azimuth}(t_k) = z_k \quad (12)$$

The elevation equations for the long- and short-term models are formed identically using the $e_n$ parameters.

It is noted that the construction of the above-described model dictates that the state transition matrix $\Phi_k$ is the identity matrix I. It is further noted that the $H_k$ matrix is a row vector. Thus, there are four sets of model equations:

(1) The short-term azimuth equations are:

$$a_{s_{k+1}} = a_{s_k} + w_{as_k} \quad (13)$$

$$Az_s(t_k) = H_{as_k} a_{s_k} + v_{as_k} \quad (14)$$

(2) The long-term azimuth equations are:

$$a_{l_{k+1}} = a_{l_k} + w_{al_k} \quad (15)$$

$$Az_l(t_k) = H_{al_k} a_{l_k} + v_{al_k} \quad (16)$$

(3) The short-term elevation equations are:

$$e_{s_{k+1}} = e_{s_k} + w_{es_k} \quad (17)$$

$$El_s(t_k) = H_{es_k} e_{s_k} + z_{es_k} \quad (18)$$

(4) The long-term elevation equations are:

$$e_{l_{k+1}} = e_{l_k} + w_{el_k} \quad (19)$$

$$El_s(t_k) = H_{el_k} e_{l_k} + v_{el_k} \quad (20)$$

It is noted that $$H_{as_k} = H_{es_k}; \; H_{al_k} = H_{el_k} \quad (21)$$

The short-term and long-term models are now written in form giving the azimuth and elevation as the result of a state-variable discrete-time equation. The Kalman filter uses these equations as the model and estimates the state variables of the system. The state variables are the parameters needed for predicting the satellite azimuth and elevation.

The basic Kalman filter equations for the tracking system of the present invention have the following form. Given the initial values x, P given inital values $\hat{x}_k^-$, $P_k^-$ $$K_k = P_k^- H_k^T (H_k P_k^- H_k^T + R_k)^{-1} \quad (22)$$

$$\hat{x}_k = \hat{x}_k^- + K_k(\hat{z}_k - H_k \hat{x}_k^-) \quad (23)$$

$$P_k = (I - K_k H_k) P_k^- \quad (24)$$

$$\hat{x}_{k+1}^- = \phi_k \hat{x}_k \quad (25)$$

$$P_{k+1}^- = \phi_k P_k \phi_k^T + Q_k \quad (26)$$

The format used in equations (22) through (26) may be found, for example, in the Pritchard text identified above. K represents the Kalman gain matrix and P is a metric used in the minimization process. The symbol "^" indicates that a value is an estimate, and the bar symbol "−" indicates that a value is a propagated value. As noted above, the Kalman filter is recursive. Beginning with initial estimates of $\hat{x}$ and P, the final calculation (equations (25) and (26)) yields the values $\hat{x}_{k+1}$ and $P_{k+1}$ for the next iteration. The terms $R_k$ and $Q_k$ are covariance matrices for $v_t$ and $w_k$. The value estimated by the filter is it. $\hat{x}_k$. Depending on the definition of the model, $P_k$ is the estimation error covariance. For the present methodology, however, this is not the case and $P_k$ is only a metric used in the minimization process as noted above. Specifically, the Kalman filter is a minimization process which minimizes (error)$^2$. $P_k$ is the covariance of the error, depending on the model. For the above-described model, it is not. Rather, it is a value related to the error. As the algorithm minimizes $P_k$, the error is minimized. Thus, $P_k$ is a measure or indicator ("metric") of the error, but is not actually the error.

From equations (22) through (26), it can be seen that the Kalman filter equations for the azimuth long-term model are:

inital values $\hat{a}_k^-, P_k^-$ $$K_k = P_k^- H_k^T (H_k P_k^- H_k^T + R_k)^{-1} \quad (27)$$

$$\hat{a}_k = \hat{a}_k^- + K_k(\hat{z}_k - H_k \hat{x}_k^-) \quad (28)$$

$$P_k = (I - K_k H_k) P_k^-  \quad (29)$$

$$\hat{a}_{k+1}^- = \hat{a}_k \quad (30)$$

$$P_{k+1}^- = P_k + Q_k \quad (31)$$

The 1 subscript indicating the long-term model is not shown in order to simplify the equations. It will be apparent that similar expressions provide the equations for the short-term azimuth and short-and long-term elevation.

The instant invention uses values for $R_k$, $Q_k$, and $P_0$ derived from experimental measurements made using antennas and a Model 8860 Antenna Tracking Controller from Scientific-Atlanta, Inc. For example, $P_0 = 10I$; $Q_k = 10^{-4}I$; $R_k = 10^{-3}$ (azimuth); and $R_k = 1.3 \times 10^{-3}$ (elevation), where $I$ is the identity matrix. The Kalman gain matrix $K_k$ is discarded after calculation since it is not required again. During long-term tracking, the value of $P_k$ may be reset every five days to prevent windup (the condition where new data is ignored) in the Kalman filter. The initial parameter estimate used in the short-term model is always zero for all parameters. This forces the algorithm to make maximum corrections in its estimates and creates a better model. As more data is collected, the value converges on a value of $a_k$ that slowly varies.

The error between the estimated azimuth and elevation and the measured azimuth and elevation will be referred to as the beam radial error. The beam radial error is calculated after each iteration using the following equation:

$$BRE = \sqrt{(el_{act} - el_{pred})^2 + (az_{act} - az_{pred})^2 \cos^2(el_{act})} \quad (32)$$

Equation (32) is an approximation and is only valid for small differences between actual and estimated measurements. Equation (32) is valid within the antenna 3 dB beamwidth. For larger errors, equation (32) returns a larger value, but the value is no longer a good approximation of the beam radial error.

Figure 8A:
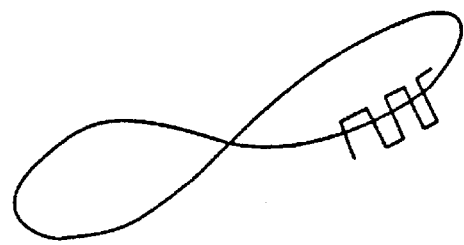
FIGS. 8A, 8B, and 8C illustrate various fine scan patterns.
Figure 8B:
Figure 8C:
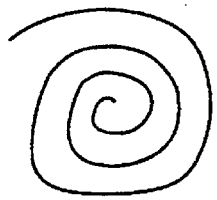

NVRAM 203 of the antenna tracking controller may store a satellite table containing information for a plurality of satellites. The entries for each satellite include the position coordinates of the antenna site, the nominal satellite position, and the inclination angle. Using this information a search pattern for a given satellite may be calculated using, for example, a program stored in EPROM 202. To acquire this satellite, antenna tracking controller 102 begins a full orbital search beginning at the top or the bottom of the calculated pattern, for example. The orbital search continues until a signal is detected that exceeds a predetermined scan differential. The scan differential is the minimum level above the background noise that is recognized as a satellite signal. For example, 3 dB may be used on a beacon and 0.1 may be used on video. Antenna tracking controller 102 stops its attempt to acquire the satellite if, after performing an orbital search, it does not detect a level from downconverter/beacon receiver 105 above the scan differential. If a signal is detected that exceeds the scan differential, antenna tracking controller 102 begins a fine scan around the point where the signal was found. In a current implementation, the fine scan is a raster scan across the satellite's position as shown in FIG. 8A. It is noted that the size of the raster scan in FIG. 8A is greatly exaggerated. The fine scan uses 9 sweeps across a box 1 beamwidth by 1 beamwidth in size. For a 6 meter Ku-band antenna, this is about 0.29°×0.29°. Other fine scans which may be used are the box scan shown in FIG. 8B and the spiral scan shown in FIG. 8C. Antenna tracking controller 102 then provides commands to antenna position controller 104 to position antenna 100 to where the peak signal was detected during the fine scan and begins a peaking process. After peaking, antenna tracking controller 102 begins building a model as will now be described with reference to FIG. 9.

Figure 9:
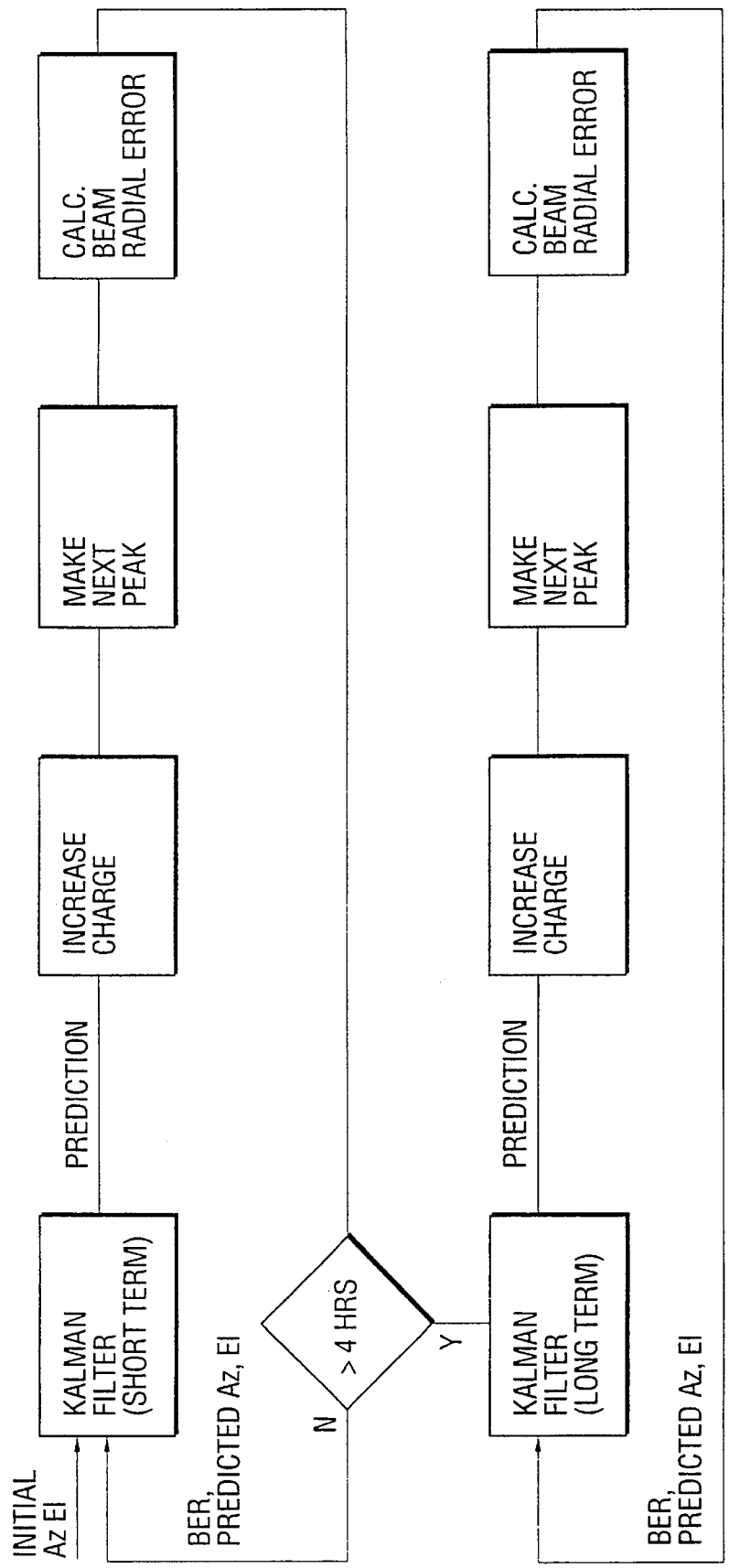
FIG. 9 is a flow chart illustrating the method of building a model in accordance with the present invention.

Referring to FIG. 9, azimuth, elevation, and error data is supplied to a short-term Kalman filter. Initially, the azimuth and elevation are assumed to be zero and it is further assumed that the beam radial error is zero, i.e., the algorithm is perfect. The short-term Kalman filter is based on the Slabinski model and uses the short term equations described above. The short-term Kalman filter is used for the first four hours of building the orbital model and uses the data supplied thereto to estimate the short-term parameters and generate a predicted azimuth and elevation. The predicted azimuth and elevation are a prediction as to the satellite position at a next sample time. After the predictions are generated, the model charge is increased as described above with respect to FIG. 7. At the next sample time, assuming an incoming beacon signal is detected, the satellite position is measured by peaking on the incoming signal strength. The predicted azimuth and elevation are compared with the measured azimuth and elevation to obtain a beam radial error in accordance with equation (32). The beam radial error and the parameters used to predict azimuth and elevation are then fed back to the short-term Kalman filter. Thus, the short-term Kalman filter is supplied with the beam radial error and the most recent estimated parameters. After the initial assumption, the beam error is no longer zero and, for the first few estimates, the beam radial error will be very large.

After four hours, the beam radial error and the most recent parameter estimates are supplied to a long-term Kalman filter. By initially loading the long-term Kalman filter with the parameter estimates of the short-term Kalman filter, the long-term Kalman filter converges on proper estimates faster. The long-term Kalman filter then predicts azimuth and elevation using the long term equations described above. The model charge is then increased and the signal strength measurements are used to peak on the satellite signal. The predictions are then compared with the actual peak to derive the beam radial error. This beam radial error and the parameters used in the most recent azimuth and elevation predictions are then fed back to the long term Kalman filter and the process is repeated. After the maximum charge value is reached (i.e., 100%), the process continues, but the model charge is no longer increased.

Figure 10:
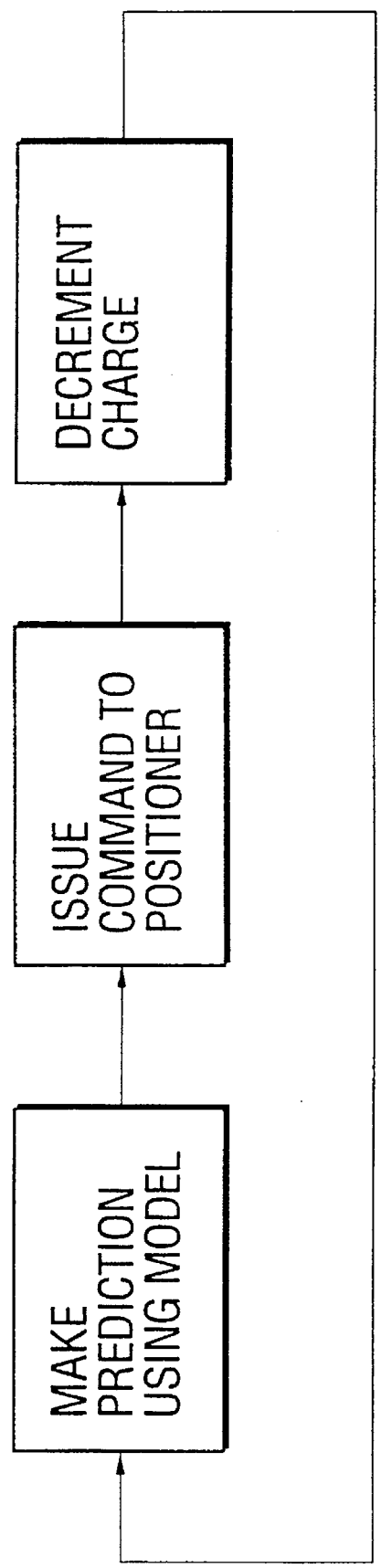
FIG. 10 is a flow chart illustrating the method of using a model in accordance with the present invention.

FIG. 10 illustrates the process of using the orbital model to track a satellite when the beacon signal is lost. First, assuming the charge is greater than about 17%, a prediction of azimuth and elevation is made using the Slabinsky model and the parameters which have been estimated. A command is issued to antenna position controller 104 for appropriately positioning antenna 100 and the charge value is decremented. The process is then repeated. If the beacon signal is found, the process of FIG. 9 is implemented and the charge value is built back up.

Using a 4.5 meter Ku-band antenna and a beacon receiver, by way of example, an RMS error of less than 10% beamwidth was consistently achieved during testing. In most cases, the model is accurate enough that a fine scan is not required when returning to a previously tracked satellite. In addition, in accordance with the inventive system, after an initial learning period, the model is of sufficient accuracy to allow peaking cycles to be skipped, relying instead on predicted moves. Typically, this learning period is 20–24 hours, and most peaking cycles are skipped except once per hour to refresh the model. This results in up to 67% fewer actuator moves, thereby extending the life of the antenna mechanical components.

As described above, a model is provided which has the ability to store database parameters using less memory since park tables are not utilized. The model also includes the ability to measure prediction performance prior to using the predictions by storing statistics on beam radial error as the parameter estimates are made. The model also provides the ability to use short-term estimates to reduce convergence time of a long-term model and the ability to measure the quality of the algorithm by assigning a charge value to the model that increases as the model processes more data and decreases during any time when the model does not receive new data.

In a current implementation, the charge is increased and decreased at different rates. A charge of 100% corresponds to a count value of 1008 counts. When the model is updated, charge increases at a rate of approximately 42 counts per hour. When the orbital model is not being updated, charge decreases at a rate of approximately 1 count per hour. Thus, a charge of 10095 is reached after approximately 24 hours and a fully charged model will drop to the INVALID region of FIG. 7 after about four weeks. Since antenna tracking controller 101 supports up to five databases, an automatic process monitors the charge and usage of each database. On a return to a satellite with a database, the tracking system of the invention uses the satellite parameters to predict the location of the satellite. When beginning construction of a new database, the first estimates of the parameters for predicting azimuth and elevation and of the beam radial error are always zero. Therefore, the initial beam radial error calculated using equation 32 is always large. The tracking system of the present invention uses the short-term model when beginning construction of a new database for the first four hours of the database time. Each time the tracking system receives a new data point from the step-track process, the tracking system of the present invention makes a prediction of azimuth and elevation using estimates of the satellite parameters. The beam radial error is calculated between the actual and predicted positions and is used as a measure of the validity of the prediction. During switch over from the short-term model to the long-term model, the tracking system makes parameter estimates using the short-term model. These parameter estimates are then supplied to the long-term model. Thus, the parameters in the long-term model are loaded with the corresponding estimated parameters from the short-term model. The short term model is then discarded.

If the beacon signal is lost, the antenna tracking controller 101 automatically attempts to point the antenna at the predicted satellite position. The quality of the prediction increases with the database charge. The inventive tracking system requires 24 hours of collected data to make predictions with an error of 5% of the 3 dB beamwidth of the antenna (within 0.1 dB down from beam peak). After four hours, the tracking system can make predictions with an error of 20% of the 3 dB beamwidth of the antenna (within 0.5 dB down from the beam peak).

In accordance with the tracking system of the present invention, no coordinate transformations are necessary for making estimations. That is, measurements are made in azimuth and elevation and calculations are carried out in this coordinate system. For making predictions, no coordinate transformations are necessary.

The antenna tracking controller of the present invention does not store park tables. Instead, as described above, a Kalman filter is used to estimate ten of the Slabinski orbital model parameters (five for azimuth and five for elevation) in the antenna-based coordinate system and these parameters are saved. This allows a database to be stored in less memory and allows storage of up to five databases in 256 Kbytes or less of RAM. The Kalman noise covariance are obtained by experimentation. The antenna tracking controller also stores a moving average of the last sixteen measurements of beam radial error as it collects data. These values may be displayed to provide an indication of system performance.

The short-term Kalman filter uses six terms of the Slabinsky model as described above and this short-term model has been found to lock into its best performance within four hours. To enhance or speed up the performance of the long-term model, the estimates generated by the short-term model at four hours are dumped into the long-term model so that the starting point of the long-term model has initial values of three parameters of each axis. The long-term model enhances these initial values with estimates of the other two parameters. The estimates of the short-term Kalman filter are not processed before being supplied to the long-term Kalman filter. They are simply loaded directly into the long-term model. The antenna tracking controller of the present invention does not weight the short-term model versus estimates of the long-term model. Instead, it is used as a starting point to enhance the locking process of the Kalman filter.

Each of the above-referenced publications is hereby incorporated by reference into the instant specification as to any subject matter deemed essential to an understanding of the present invention.

While there has been shown and described the preferred embodiments of the invention, it will be evident to those skilled in the art that various modifications may be made thereto without departing from the spirit and scope of the invention which is set forth in the appended claims.

We claim:

1. An antenna tracking controller for generating signals used to position an antenna for tracking a moving signal source, said antenna tracking controller comprising:

a first Kalman filter for estimating parameters of a first model of the motion of said moving signal source; and a second Kalman filter for estimating parameters of a second model of the motion of said moving signal source, wherein said second Kalman filter uses the parameters estimated by said first Kalman filter as initial values.

2. The antenna tracking controller according to claim 1, further comprising:

a counter for counting in a first direction while said first and second Kalman filters estimate parameters based on measurements and for counting in a second direction while said antenna is positioned based on said model and no measurements are made, wherein the count of said counter constitutes a measure of the quality of the data.

3. The antenna tracking controller according to claim 2, wherein said counter counts in the first direction at a first rate and in the second direction at a second rate slower than the first rate.

4. A tracking system for tracking a moving signal source, comprising:

an antenna;

a motor for moving said antenna;

an antenna tracking controller for generating antenna tracking signals, said antenna tracking controller including a first Kalman filter for estimating parameters of a first model of the motion of said moving signal source and a second Kalman filter for estimating parameters of a second model of the motion of said moving signal source, wherein said second Kalman filter uses the parameters estimated by said first Kalman filter as initial values; and an antenna position controller responsive to said antenna tracking signals for generating motor driving signals which are supplied to said motor for driving said motor to position said antenna.

* * * * *